United States Patent
Rausch (10) Patent No.: US 10,823,187 B2
(45) Date of Patent: Nov. 3, 2020

(54) METHOD OF MAKING A CENTRIFUGAL PUMP IMPELLER

(71) Applicant: Bühler Motor GmbH, Nuremberg (DE)

(72) Inventor: Harald Rausch, Fürth (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 58 days.

(21) Appl. No.: 15/627,810

(22) Filed: Jun. 20, 2017

(65) Prior Publication Data

US 2017/0370373 A1 Dec. 28, 2017

(30) Foreign Application Priority Data

Jun. 28, 2016 (DE) .......................... 10 2016 211 605

(51) Int. Cl.
*F04D 29/22* (2006.01)
*B29C 65/00* (2006.01)
(Continued)

(52) U.S. Cl.
CPC .......... *F04D 29/2222* (2013.01); *B29C 65/08* (2013.01); *B29C 66/112* (2013.01); *B29C 66/116* (2013.01); *B29C 66/301* (2013.01); *B29C 66/30223* (2013.01); *B29C 66/5344* (2013.01); *B29C 66/54* (2013.01);
(Continued)

(58) Field of Classification Search
CPC ............... B29C 65/08; B29C 66/30223; B29L 2031/7496; F05D 2230/239
See application file for complete search history.

(56) References Cited

U.S. PATENT DOCUMENTS 5,538,395 A * 7/1996 Hager ................... B29C 66/301
416/144
6,123,798 A * 9/2000 Gandhi ................... B07C 5/342
156/292

(Continued)

FOREIGN PATENT DOCUMENTS

JP S59103998 A * 6/1984 ............. B29C 65/08
JP S5672293 A * 7/1987 ............. B29C 65/08
(Continued)

OTHER PUBLICATIONS

Machine Translation of JPH05016241 (Year: 1993).*
(Continued)

*Primary Examiner* — Jacob J Cigna
*Assistant Examiner* — Michael W Hotchkiss
(74) *Attorney, Agent, or Firm* — Westerman, Hattori, Daniels & Adrian, LLP (57) ABSTRACT

A method for producing a centrifugal pump impeller having a base plate, which is a single piece with pump blades and a cover plate, which consists of a thermoplastic material, wherein contact areas are available, which are heated and melted by means of ultrasonic excitation and form a close bonded connection after cool-down. The objective of the invention is to ensure inherent stability with the individual parts and a simple and reliable pre-assembly as well as a fixed mechanical connection, wherein only a small amount of excitation energy is required, with a centrifugal pump impeller comprising a base plate and cover plate.

14 Claims, 6 Drawing Sheets (51) Int. Cl.
    *F04D 29/02*     (2006.01)
    *B29C 65/08*     (2006.01)
    *B29C 65/78*     (2006.01)
    *B29L 31/00*     (2006.01)

(52) U.S. Cl.
    CPC ...... *B29C 66/73921* (2013.01); *F04D 29/026* (2013.01); *F04D 29/2227* (2013.01); *B29C 65/7802* (2013.01); *B29L 2031/7496* (2013.01); *F05D 2230/239* (2013.01)

(56) References Cited

U.S. PATENT DOCUMENTS

| | | | | |
|---|---|---|---|---|
| 6,298,960 | B1* | 10/2001 | Derr | B29C 65/08 188/290 |
| 8,793,872 | B2* | 8/2014 | Adachi | B29C 66/322 29/889.7 |
| 10,267,313 | B2* | 4/2019 | Bernreuther | F04D 13/0606 |
| 2005/0071998 | A1* | 4/2005 | Rocky | B29C 65/08 29/889 |
| 2007/0262488 | A1* | 11/2007 | Chen | B24B 37/32 264/249 |
| 2015/0211523 | A1* | 7/2015 | Bernreuther | F04D 13/0606 416/3 |
| 2017/0268526 | A1* | 9/2017 | Seok | F04D 29/242 |

FOREIGN PATENT DOCUMENTS

| | | | | |
|---|---|---|---|---|
| JP | H0516241 | A * | 1/1993 | .............. B29C 65/08 |
| JP | 2009221942 | A * | 10/2009 | ........... F04D 29/086 |
| JP | 2010229953 | A * | 10/2010 | ........... B29C 66/301 |
| JP | 2010236493 | A * | 10/2010 | ........... B29C 66/114 |
| JP | 2011218583 | A * | 11/2011 | ............. B29C 65/08 |
| WO | WO-2015064514 | A1 * | 5/2015 | ........... F04D 29/626 |

OTHER PUBLICATIONS

Machine Translation of JPS59103998 (Year: 1984).*
Machine Translation of JP2010236493 (Year: 2010).*
Machine Translation of JP2011218583 (Year: 2011).*
Machine Translation of JPS5672293 (Year: 1981).*
Machine Translation of JPS59103998A (Year: 1984).*
Snapshot of (http://www.patsonics.com/wordpress/?tag=ultrasonic-welding) "Ultrasonic Weld Joint & Part Design" (Year: 2009).*
Machine Translation of JP-2010229953-A (Year: 2010).*
Machine Translation of WO-2015064514-A1 (Year: 2015).*
Machine Translation of JP-2010236493-A (Year: 2010).*
Machine Translation of JP-2009221942-A (Year: 2009).*

\* cited by examiner

METHOD OF MAKING A CENTRIFUGAL PUMP IMPELLER

BACKGROUND OF THE INVENTION

(1) Field of the Invention

The invention relates to a method for producing a centrifugal pump impeller having a base plate, which is a single piece with pump blades and a cover plate.

(2) Description of Related Art Including Information Disclosed Under 37 CFR 1.97 and 1.98

Ultrasonic welding methods have long been used to join together thermoplastics. This is part of the group of friction welding methods and they differ by the type of friction generation. With friction welding, generally a quick rotary movement of a part to be joined together is executed upon contact with the second part to be joined together and thereby sufficient heat is generated in order to melt the joining zone. For parts that are not rotationally symmetrical, friction welding is not usable or is used only in rare cases. In this case, the ultrasonic welding method is better, because oscillations of very low amplitude are used here to obtain the friction heat and therefore even complicated shapes can be used as the welding zone. However, it is important that it be possible to keep the ultrasonic energy concentrated onto as small a friction surface as possible.

U.S. Pat. No. 8,793,872 discloses a centrifugal pump impeller in which the pump vanes are equipped with narrow rib-like protrusions and the cover plate forms a smooth cone-shaped surface. The smooth surface means that there is no possibility of simple pre-adjustment and pre-assembly of the parts to be joined together. In addition, there may be molding inaccuracies during cool-down of the cast cover plate.

An object of the present invention is to ensure inherent stability with the individual parts and a simple and reliable pre-assembly as well as a fixed mechanical connection, wherein only a small amount of excitation energy is required, with a centrifugal pump impeller comprising a base plate and cover plate.

BRIEF SUMMARY OF THE INVENTION

The objective of the present invention is achieved according to a method for producing a centrifugal pump impeller having a base plate, which is a single piece with pump blades and a cover plate, which consists of a thermoplastic material, wherein contact areas are available, which are heated and melted by means of ultrasonic excitation and form a close bonded connection after cool-down.

The ribs on the cover plate serve as reinforcement ribs. In this manner, the cover plate can be produced in a more accurate shape and a sonotrode can be evenly placed on the cover plate to create ultrasonic vibrations and to apply this vibrational energy to a solid. Because the ribs are a component of the cover plate, the adjacent areas automatically serve as locating surfaces, particularly if these areas are not melted for geometric reasons. To this end, the ribs are significantly narrower at their base than the pump blades at their upper surfaces opposite the ribs.

In further embodiments of the present invention, a provision is that two locating surfaces, which extend to both sides of the ribs, are provided in the cover plate. In this manner, the pump blades can be supported on the cover plate. Even better support is ensured when the locating zones connecting in the longitudinal direction of the ribs also serve as support zones. The ribs are completely surrounded by support surfaces/support zones in this manner. This leads to a defined geometric allocation between the base plate and the cover plate.

In a second embodiment of the invention, the ribs are each arranged in a groove-like recess in the cover plate. The recess serves as an additional reinforcement element and primarily as a joining aid. The width of the recess here is significantly larger than the width of the ribs so that some play remains.

In a refinement of the second embodiment, a recess-like groove extends along the ribs between the locating surfaces and the ribs. These grooves serve to concentrate the ultrasonic energy on the weld point even better. In order to increase the strength of the welded connection and accelerate the melting process, an impeller blade is provided instead of two parallel extending ribs.

Ultrasonic welding can also lead to the formation of particles, which is why it is beneficial for the groove-like recess to be designed only 0.1 mm to 0.4 mm wider than the pump blades. In this manner, particularly larger particles remain caught within the recess.

A further provision is that the recess becomes narrower as the depth increases, and the pump blades taper at their ends facing toward the cover plate. This causes the gap between the pump blades and the recess to narrow and the resulting particles are additionally caught and partially melted and firmly bonded together.

BRIEF DESCRIPTION OF THE SEVERAL VIEWS OF DRAWINGS

The invention is better understood by reading the following detailed description of the preferred embodiments with reference to the accompanying drawing figures, in which like reference numerals refer to like elements throughout, and in which.

Note: The reference numbers with index alpha characters and the corresponding reference numbers without index characters refer to details with the same name in the drawings and the drawing description. This reflects use in another embodiment or the prior art, and/or the detail is a variant. The reference number list contains only reference numbers without index characters for the sake of simplicity.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
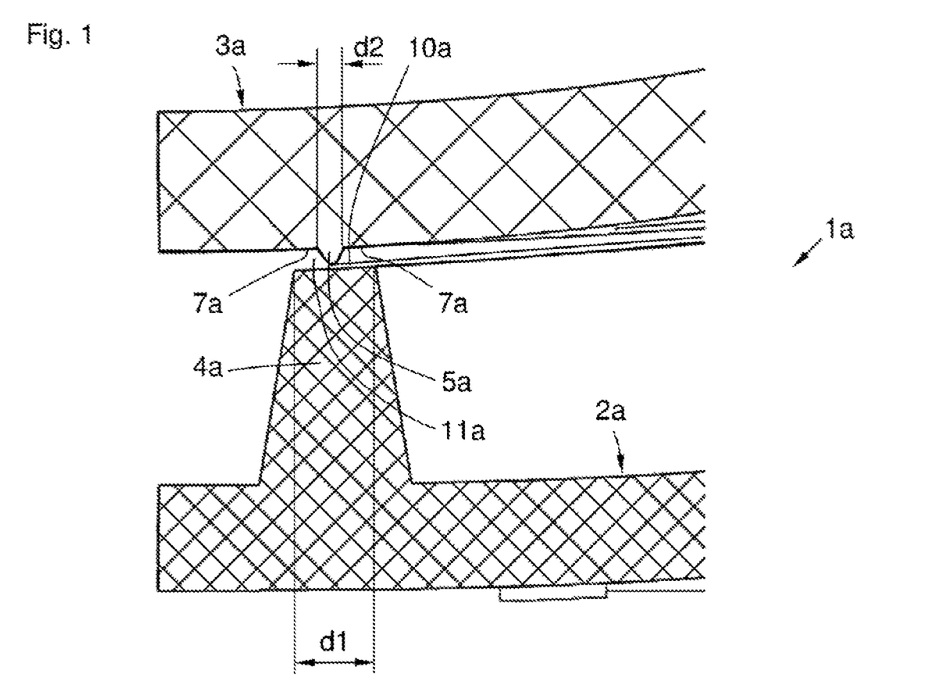
FIG. 1 shows a partial sectional view of a first embodiment of the invention.

FIG. 1 shows a partial sectional view of a first embodiment of a centrifugal pump impeller 1a, having a base plate 2a and a cover plate 3a, wherein the base plate 2a is a single piece with pump blades 4a having a trapezoidal cross-section and the cover blade 3a is a single piece with protruding ribs 5a (one of which is visible). The base plate 2a, the cover plate 3a, and the pump blades 4a define a liquid channel, through which a conveyed medium, such as a coolant, can be conveyed. The ribs 5a protrude from the cover plate surface such that locating surfaces 7a emerge laterally from the ribs 5a, with which an upper surface 10a of the pump blade 4a can make contact during and/or after a welding process. The minimum width d1 of the pump blades 4a, which is deemed present at the upper surface 10a, is significantly greater than the maximum width d2 of the ribs 5a. The ribs 5a are also characterized as energy directors. The width of the ribs 5a reduces in the direction of the pump blades 4a and form, as illustrated, a reverse triangular roof shape. If a sonotrode is placed on the cover plate 3a and the cover plate 3a is placed into ultrasonic oscillation, the oscillation energy is concentrated onto the points of the ribs. They heat up and start to soften. The adjoining areas of the upper surface 10a of the pump blades 4a are melted. In doing so, both parts to be joined together are moved toward one another such that a gap 11a maintained by the ribs 5a closes and a close connection of the adjoining material areas is formed. This process is continued until the upper surface 10a of the pump blades 4a makes contact with the locating areas 7a of the cover plate. In doing so, excess material of the ribs 5a may be displaced into the gap 11a.

Figure 2:
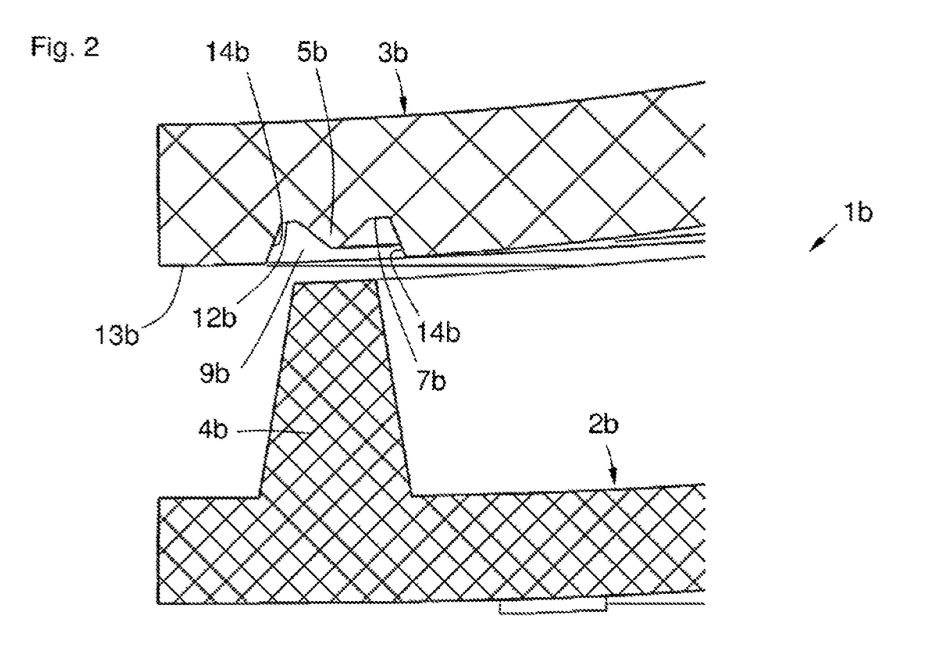
FIG. 2 shows a partial sectional view of a second embodiment of the invention.

FIG. 2 shows a second embodiment of the centrifugal pump impeller 1b having a base plate 2b and a cover plate 3b. The base plate 2b is formed identically to FIG. 1. The cover plate 3b has longitudinal recesses 9b, which correspond to the pump blades 4b of the base plate 2b. Within the recesses 9b, ribs 5b protrude from the base of the recess 9b, but do not reach the surface 13b of the cover plate 3b. In this manner, the recesses 9b enable a pre-centering of the base plate 2b and the cover plate 3b while interacting with the pump blades 4b. The pre-centering here is not carried out by the ribs 5b but rather by sidewalls 14b of the recesses and by the pump blades 4b. Furthermore, the recesses 9b and the ribs 5b may improve the inherent stability of the cover plate 3b. The base 12b of the recess 9b simultaneously forms the locating surface 7b.

Figure 3:
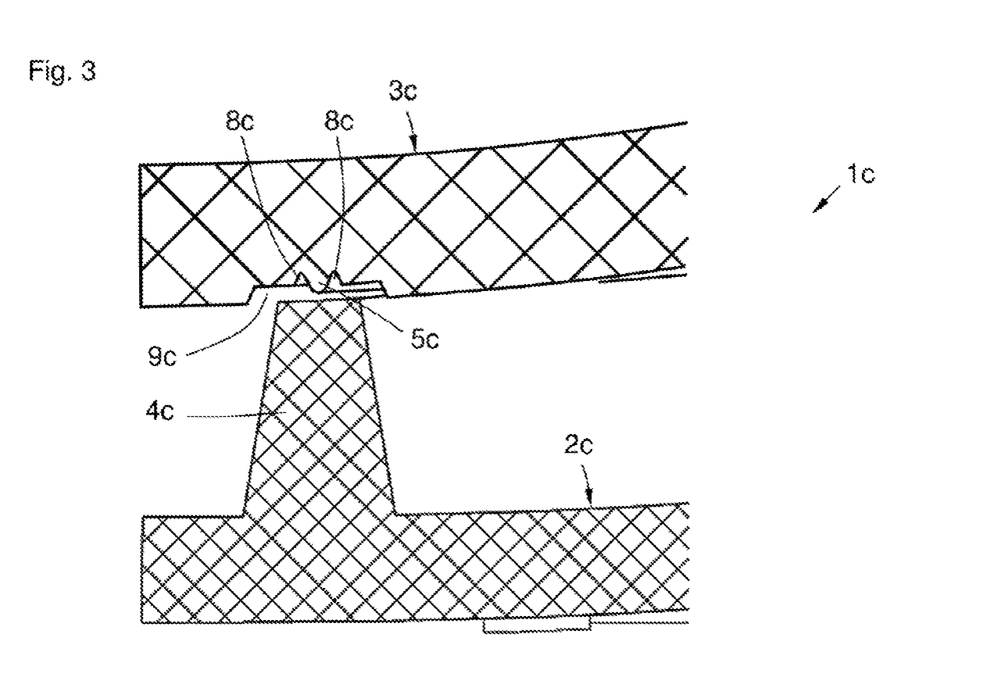
FIG. 3 shows a partial sectional view of a first variation of the second embodiment of the invention.

FIG. 3 shows a first variant of the second embodiment of the centrifugal pump impeller 1c having a base plate 2c and a cover plate 3c. The base plate 2c corresponds to the embodiment of FIGS. 1 and 2. The cover plate 3c has a recess 9c similar to FIG. 2. There are two recess-like grooves 8c, which border a rib 5c laterally, within the recess 9c.

Figure 4:
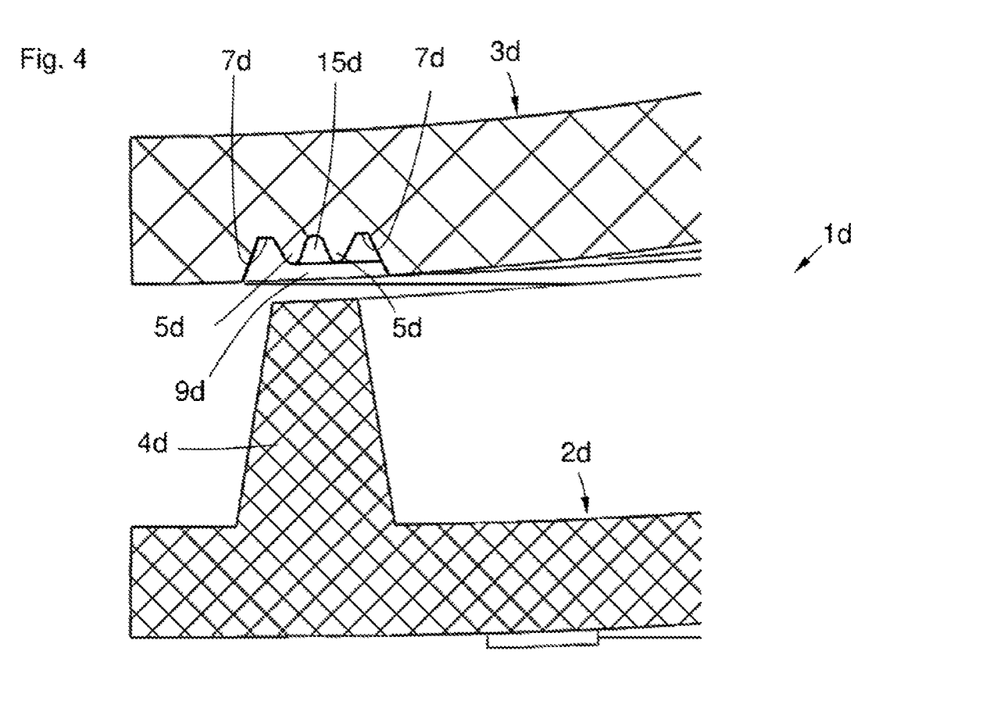
FIG. 4 shows a partial sectional view of a second variation of the second embodiment of the invention.

FIG. 4 shows a second variant of the second embodiment of the centrifugal pump impeller 1d having a base plate 2d and a cover plate 3d. The base plate 2d corresponds to the embodiment of FIGS. 1, 2, and 3. The cover plate 3d has a recess 9d similar to FIGS. 2 and 3. There are two ribs 5d, which are bordered by a clearance 15d, within the recess 9d. The base 12d of the recess 9d forms the locating surfaces 7d, which border an axial feed during the welding process. The second rib improves the mechanical strength of the connection between the base plate 2d and the cover plate 3d.

Figure 5:
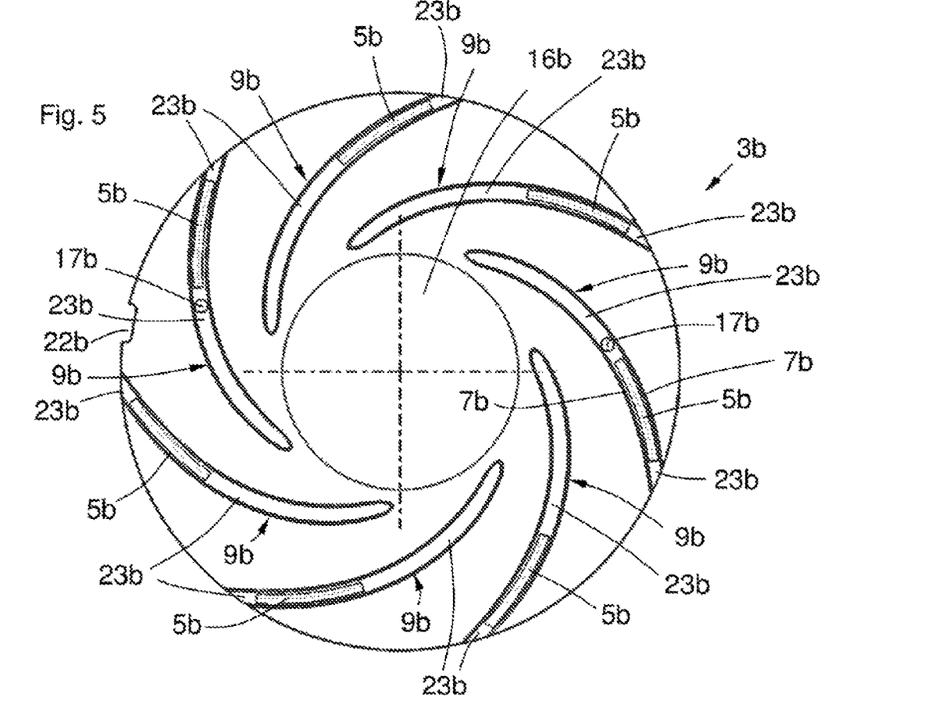
FIG. 5 shows a view of a cover plate of a centrifugal pump impeller.
Figure 6:
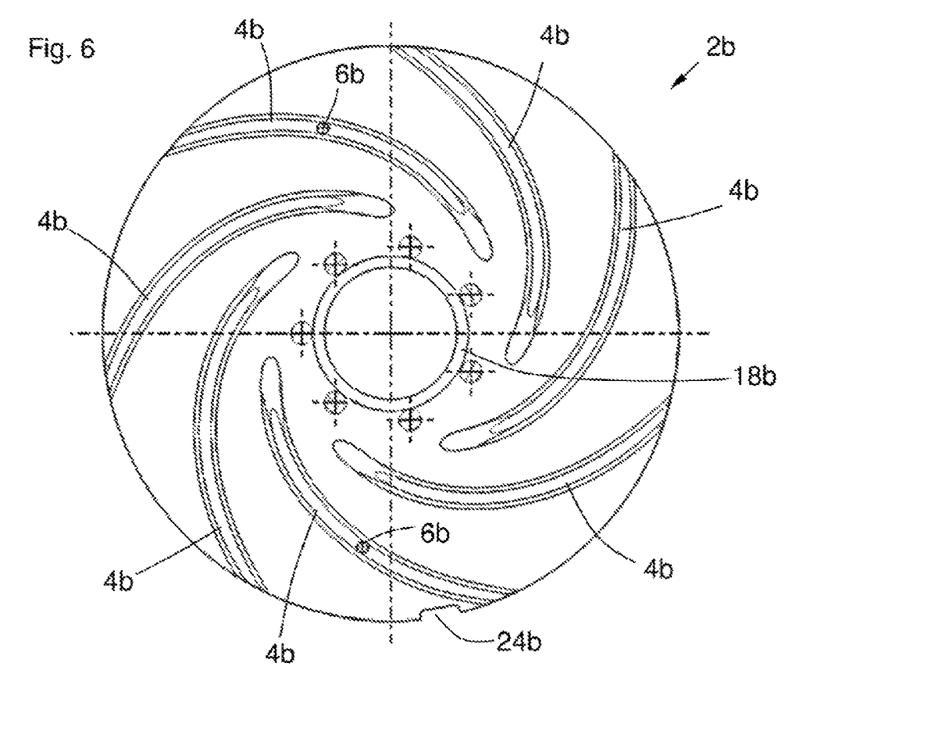
FIG. 6 shows a view of a base plate of the centrifugal pump impeller.

FIG. 5 shows a cover plate 3b of the second embodiment according to FIG. 2, shown from the side to be welded. The cover plate 3b has a central opening 16b, through which the medium to be conveyed can flow. The cover plate 3b has a disc shape in its projected image and has seven recesses 9b. One rib 5b protrudes from each recess 9b. The length of the ribs 5b is significantly shorter than the length of the recesses 9b. The ribs 5b are less than half the length of the recesses 9b and extend from a peripheral area toward the inside in the shape of a spiral. This results in locating zones 23b, which enable a reliable and precise alignment of the parts to be joined, on both sides of the ribs 5b in their longitudinal direction. Additional locating surfaces 7b on the side of the ribs 5b (reference numbers only indicated on one rib) enhance this effect and result in a defined smooth locating surface. The recesses 9b correspond to pump blades 4b as shown in FIG. 6. Two recesses 9b additionally have mortises 17b, which serve assembly in the correct angular position and a torsionally resistant connection. A notch 22b enables the optical detection and positionally correct alignment of the cover plate 3b during assembly.

FIG. 6 shows a base plate 2b with pump blades 4b and pins 6b. The pins 6b are used for access into the mortises 17b of FIG. 5. An inner ring 18b extends from the drawing plane in the center of the base plate 2b. The inner ring 18b is a single piece with the base plate 2b and adjoins a ring-shaped inflow area of the conveyed medium into the centrifugal pump impeller. A notch 24b at the edge of the base plate 2b enables the optical detection and positionally correct alignment of the base plate 2b during assembly.

Figure 7:
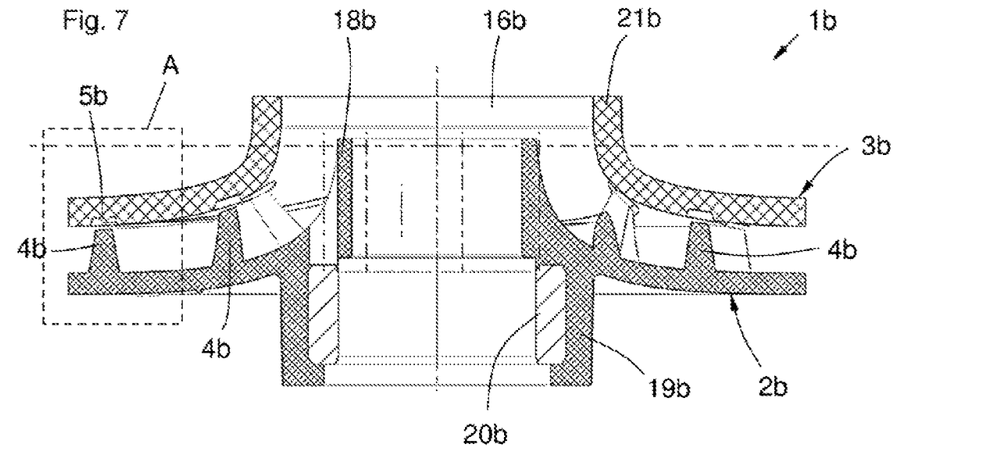
FIG. 7 shows a first assembly position between the base plate and the cover plate.

FIG. 7 shows a sectional view through the centrifugal pump impeller 1b with the base plate 2b and the cover plate 3b of the second embodiment. The representation shows the base plate 2b and the cover plate 3b in a first assembly position, wherein there is an space between the parts to be joined, particularly the pump blades 4b and the ribs 5b.

Figure 8:
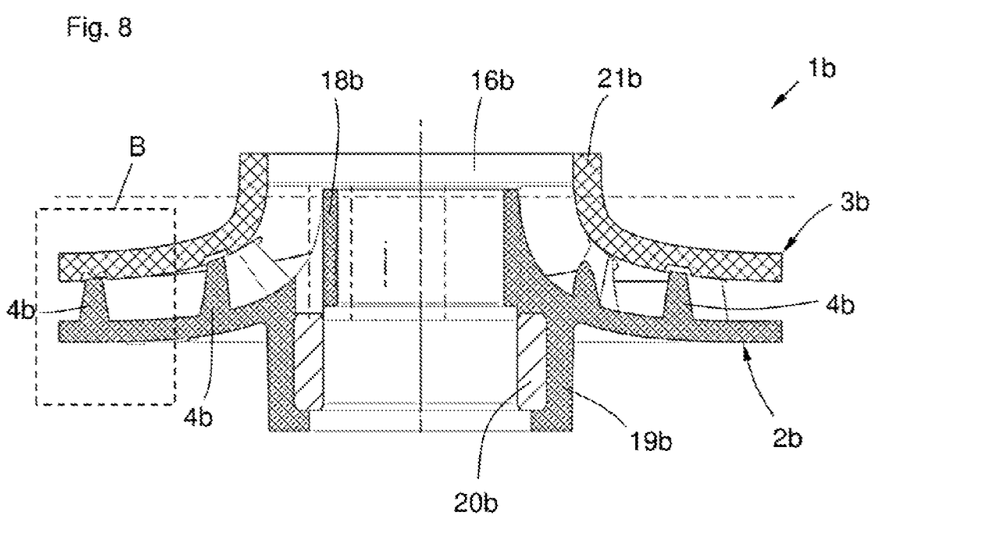
FIG. 8 shows a second assembly position between the base plate and the cover plate.

FIG. 8 shows the same arrangement as FIG. 7, wherein the base plate 2b and the cover plate 3b are shown in a second assembly position, in which the pump blades 4b and the ribs 5b make contact and the welding process is initiated. Furthermore, FIGS. 7 and 8 show the opening 16b, the inner ring 18b, an outer ring 21b, a bushing mount 19b, and a brass bushing 20b. The bushing 20b is used to press onto a permanent magnetic rotor. The brass bushing 20b is injection-molded into the base plate 2b for this purpose.

Figure 9:
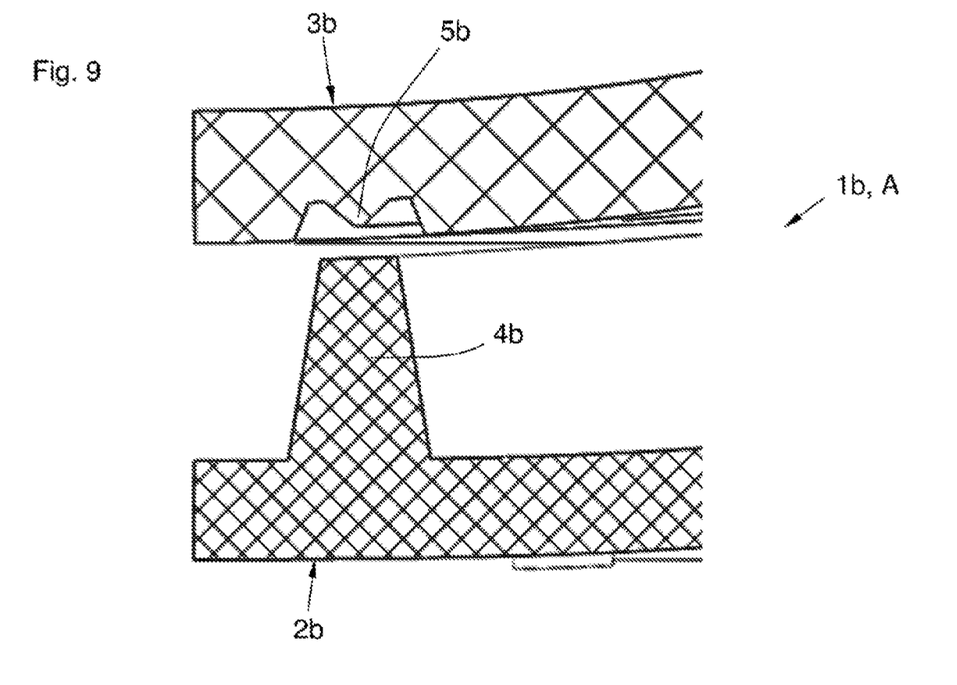
FIG. 9 shows an enlarged section of FIG. 7.

FIG. 9 shows an enlarged section A of FIG. 7 in the connection area, with the base plate 2b, the cover plate 3b, a pump blade 4b, and a rib 5b, wherein the pump blade 4b has an space with respect to the rib 5b.

Figure 10:
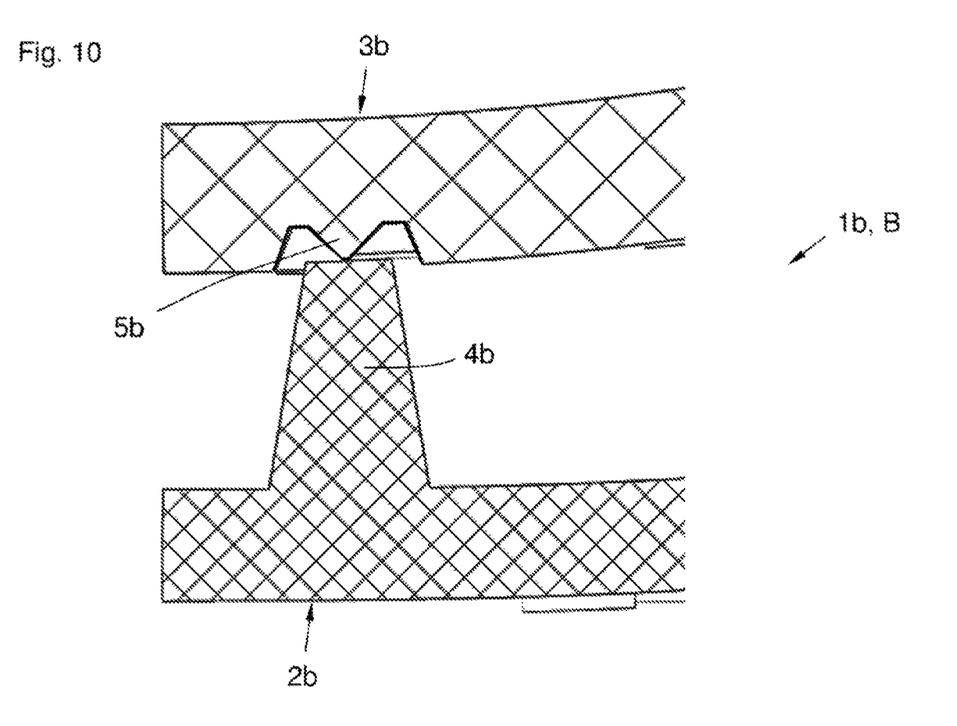
FIG. 10 shows an enlarged section of FIG. 8.

FIG. 10 shows an enlarged section B of FIG. 8 in the connection area, with the base plate 2b, the cover plate 3b, a pump blade 4b, and a rib 5b, wherein the pump blade 4b and the rib 5b are making contact with one another.

Figure 11:
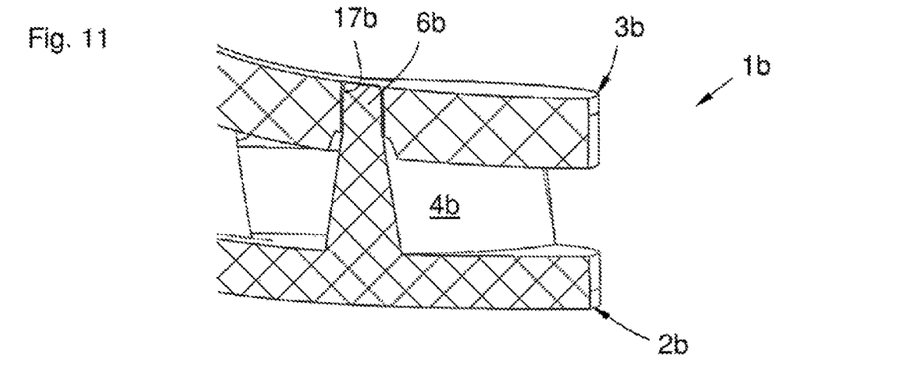
FIG. 11 shows a partial sectional view through a pin.

FIG. 11 shows a sectional view through a pin 6b as a one-piece component of the base plate 2b in the assembled state. The pin 6b penetrates into the mortise 17b of the cover plate 3b.

Figure 12:
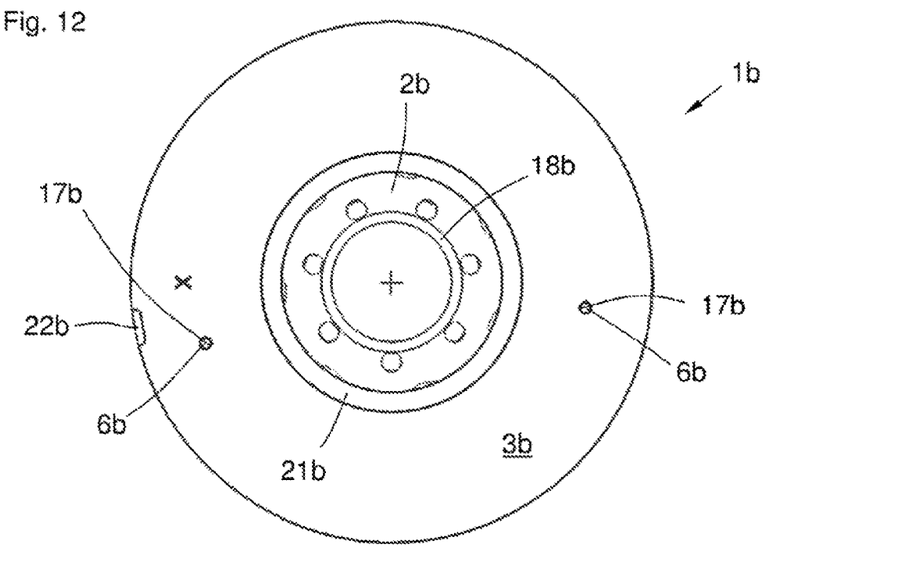
FIG. 12 shows the top view of the assembled centrifugal pump impeller.

FIG. 12 shows a top view of the assembled centrifugal pump impeller 1b, with the base plate 2b, the cover plate 3b, the pin 6b, the mortises 17b, the inner ring 18b, and the outer ring 21b. The cover plate 3b has a notch 22b, which is used for optical detection of the angular position during assembly.

Figure 13:
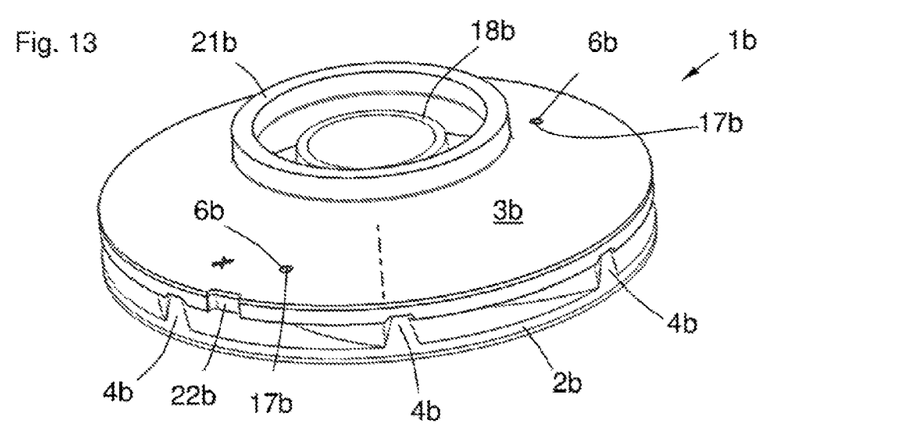
FIG. 13 shows a three-dimensional representation of the assembled centrifugal pump impeller.

FIG. 13 shows a three-dimensional representation of the assembled centrifugal pump impeller 1b, with the base plate 2b, the cover plate 3b, the pin 6b, the mortises 17b, the blades 4b, the inner ring 18b, the outer ring 21b, and the notch 22b.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Centrifugal pump impeller
2 Base plate
3 Cover plate
4 Pump blade
5 Rib
6 Pin
7 Locating surface
8 Groove
9 Recess
10 Upper surface
11 Gap
12 Base
13 Surface
14 Sidewall
15 Clearance
16 Opening
17 Mortise
18 Inner ring
19 Bushing mount
20 Brass bushing
21 Outer ring
22 Notch
23 Locating zone
24 Notch

What is claimed is:

1. A method for producing a centrifugal pump impeller, the method comprising the steps of:
providing a base plate that is a single piece with multiple pump blades each having a minimum wall thickness d1 and an upper surface;
providing a cover plate consisting of thermoplastic material, with the cover plate having meltable ribs with a maximum width d2 at its base, the ribs being aligned with the pump blades and being narrower at their ends facing the pump blades than at their base and the maximum width d2 of the ribs is smaller than the minimum wall thickness d1 of the pump blades;
providing locating areas on either side of each meltable rib, the locating areas being parallel to the corresponding upper surface of a wall;
aligning the cover plate with respect to the base plate;
placing a sonotrode at the cover plate and pressing the cover plate against the base plate;
creating friction heat in the contact areas between the ribs and the pump vanes, thus melting the ribs;
feeding of the cover plate in the direction of the pump blades in order to create a close connection of the locating areas and wall upper surfaces adjacent to one another; and
displacing excess material into an area between the upper surfaces of the pump blades and the locating surfaces of the cover plate.

2. The method according to claim 1, further comprising the step of providing mortises in at least two recesses in the cover plate and pins on at least two pump blades, the pins mating with the mortises to ensure correct angular position during assembly.

3. The method according to claim 1, further comprising the step of extending grooves along the ribs between each of the locating surfaces and a corresponding one of the ribs.

4. The method according to claim 1, wherein one impeller blade is provided for every two parallel extending ribs.

5. The method according to claim 1, further comprising the steps of providing a recess in the cover plate and arranging the ribs in the recess in the cover plate.

6. The method according to claim 5, wherein the recess is only 0.1 mm to 0.4 mm wider than the pump blade.

7. The method according to claim 5, wherein the recess becomes narrower as the depth increases, and the pump blades taper at their ends facing toward the cover plate.

8. A method for producing a centrifugal pump impeller, the method comprising the steps of:
providing a base plate that is a single piece with multiple pump blades each having a minimum wall thickness d1 and an upper surface;
providing a cover plate consisting of thermoplastic material, with the cover plate having meltable ribs with a maximum width d2 at its base, the ribs being aligned with the pump blades and being narrower at their ends facing the pump blades than at their base and the maximum width d2 of the ribs is smaller than the minimum wall thickness d1 of the pump blades;
providing locating areas on either side of each meltable rib, the locating areas being parallel to the corresponding upper surface of a wall;
aligning the cover plate with respect to the locating areas of the base plate and the upper surfaces of the pump blades;
placing an oscillation excitation device at the cover plate and pressing the cover plate against the base plate;
creating friction heat in the contact areas between the ribs and the pump vanes, thus melting the ribs;
feeding of the cover plate in the direction of the pump blades in order to create a close connection of the locating areas and wall upper surfaces adjacent to one another; and
displacing excess material into an area between the upper surfaces of the pump blades and the locating surfaces of the cover plate.

9. The method according to claim 8, further comprising the step of providing mortises in at least two recesses in the cover plate and pins on at least two pump blades, the pins mating with the mortises to ensure correct angular position during assembly.

10. The method according to claim 8, further comprising the step of extending grooves along the ribs between each of the locating surfaces and a corresponding one of the ribs.

11. The method according to claim 8, wherein one impeller blade is provided for every two parallel extending ribs.

12. The method according to claim 8, further comprising the steps of providing a recess in the cover plate and arranging the ribs in a recess in the cover plate.

13. The method according to claim 12, wherein the recess is only 0.1 mm to 0.4 mm wider than the pump blade.

14. The method according to claim 12, wherein the recess becomes narrower as the depth increases, and the pump blades taper at their ends facing toward the cover plate.

* * * * *